(12) United States Patent
Veach

(10) Patent No.: US 7,818,207 B1
(45) Date of Patent: Oct. 19, 2010

(54) GOVERNING THE SERVING OF ADVERTISEMENTS BASED ON A COST TARGET

(75) Inventor: Eric Veach, Mountain View, CA (US)

(73) Assignee: Google, Inc., Mountainview, CA (US)

( * ) Notice: Subject to any disclaimer, the term of this patent is extended or adjusted under 35 U.S.C. 154(b) by 2276 days.

(21) Appl. No.: 10/340,553

(22) Filed: Jan. 10, 2003

(51) Int. Cl.
*G06Q 30/00* (2006.01)

(52) U.S. Cl. .............. 705/14.46; 705/14.48; 705/14.69; 705/14.73

(58) Field of Classification Search ............. 705/14, 705/27, 14.46, 14.48, 14.69, 14.73; 707/3
See application file for complete search history.

(56) References Cited

U.S. PATENT DOCUMENTS

| | | | |
|---|---|---|---|
| 6,269,361 B1 | 7/2001 | Davis et al. | |
| 6,401,075 B1 * | 6/2002 | Mason et al. | 705/14 |
| 7,373,599 B2 | 5/2008 | McElfresh et al. | |
| 2002/0062245 A1 * | 5/2002 | Niu et al. | 705/14 |
| 2002/0169760 A1 * | 11/2002 | Cheung et al. | 707/3 |
| 2003/0014331 A1 * | 1/2003 | Simons | 705/27 |
| 2003/0055729 A1 * | 3/2003 | Bezos et al. | 705/14 |
| 2004/0059708 A1 | 3/2004 | Dean et al. | |

OTHER PUBLICATIONS

"Standard Terms and Conditions for Internet Advertising for Media Buys One Year or Less", version 2.0, downloaded Jun. 8, 2010 from http://www.iab.net/media/file/standards_termsandcond2.pdf.*
AOL Ad Specs Terms and Conditions, downloaded Jun. 8, 2010 from http://advertising.aol.com/ad-specs/terms-conditions/current-terms-conditions/aol-advertising-inc-/-iab-standard-terms-and-cond.*

* cited by examiner

*Primary Examiner*—Donald L Champagne
(74) *Attorney, Agent, or Firm*—Straub & Pokotylo; John C. Pokotylo

(57) ABSTRACT

Helping advertisers to control marketing expenditures by governing the delivery of an advertisement over a time period. Such governing may be accomplished by (a) determining an expected cost associated with delivering the advertisement, ungoverned, over the time period; and (b) governing the delivery of the advertisement based on the expected cost and a target cost. The delivery of the advertisement may be also governed based on time remaining in the time period, budget deficits from past periods, budget surpluses from past periods, a start date and an end date associated with the advertisement, time since a start date associated with the advertisement, and/or time until an end date associated with the advertisement. The target cost may be based on a predefined budget.

38 Claims, 7 Drawing Sheets

GOVERNING THE SERVING OF ADVERTISEMENTS BASED ON A COST TARGET

§1. BACKGROUND OF THE INVENTION

§1.1 Field of the Invention

The present invention concerns advertising. In particular, the present invention concerns governing the serving (also referred to as "delivery") of advertisements based on some cost target, such as a cost budget for a given period of time.

§1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" in the Specification without loss of generality) selects one of these banner ads by clicking on it, embedded hypertext links typically direct the viewer to the advertiser's Web site. This process, wherein the viewer selects an ad, is commonly referred to as a "click-through". The ratio of the number of click-throughs to the number of impressions of the ad (i.e., the number of times an ad is displayed) is commonly referred to as the "click-through rate" of the ad.

Despite the initial promise of Web site-based advertisement, there remain several problems with existing approaches. For example, the costs for such advertisements are typically based on impressions, or based on click-throughs. Although the number of future impressions and click-throughs can, in some instances, be forecast fairly accurately, often, the number of impressions or click-throughs of an advertisement cannot be known with certainty, or with a desired degree of certainty. Since advertising costs are often tied to impressions and click-throughs, such costs cannot be known with certainty, or with a desired degree of certainty. Advertisers may be reluctant to enter into such open-ended obligations without some control over costs.

Accordingly, it is desired to permit advertisers to place budgetary constraints on costs associated with advertisement campaigns. At the same time, the entity being paid to serve such advertisements desires to maximize their revenue subject to such budgetary constraints. Advertisers may also desire that advertisements in an ad campaign be served in a fairly regular (or at least non-arbitrary) basis over a given period of time.

§2. SUMMARY OF THE INVENTION

The present invention helps advertisers to budget their advertising expenditures, while allowing an ad serving entity to maximize its revenue subject to advertisers' budget constraint(s). The present invention may do so by estimating an expected cost if an ad were subject to no budgetary constraints, and governing the serving of the ad based the expected cost and the budget constraint(s).

§3. BRIEF DESCRIPTION OF THE DRAWINGS

§4. DETAILED DESCRIPTION

The present invention may involve novel methods, apparatus, message formats and/or data structures for governing the delivery of advertisements based on target cost information. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention any patentable subject matter described below.

In the following, environments in which the present invention may operate are described in §4.1. Then, exemplary embodiments of the present invention are described in §4.2. Thereafter, an example of operations in an exemplary embodiment is provided in §4.3 Finally, some conclusions regarding the present invention are set forth in §4.3.

§4.1 Environments in which, or with which, the Present Invention May Operate

§4.1.1 Exemplary Advertising Environment

Figure 1:
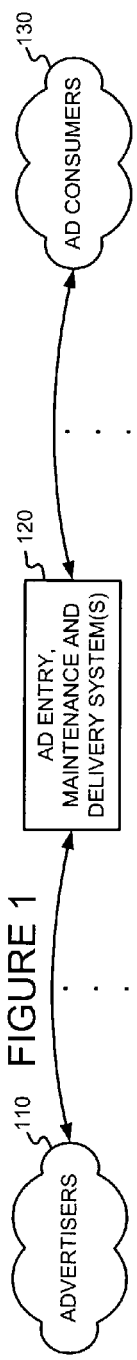
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, text-based ads, audio ads, video ads, ads combining various media types, etc. Ad consumers 130 may submit requests for ads to, accept ads responsive to their request from, and provide historical or usage information to, the system 120. Although not shown, other entities may provide historical or usage information (e.g., whether or not a conversion or click-through related to the ad occurred) to the system 120.

One example of an ad consumer 130 is a general content server which receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to that user. Finally, the content server may transmit information about the ads and how the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

Figure 3:
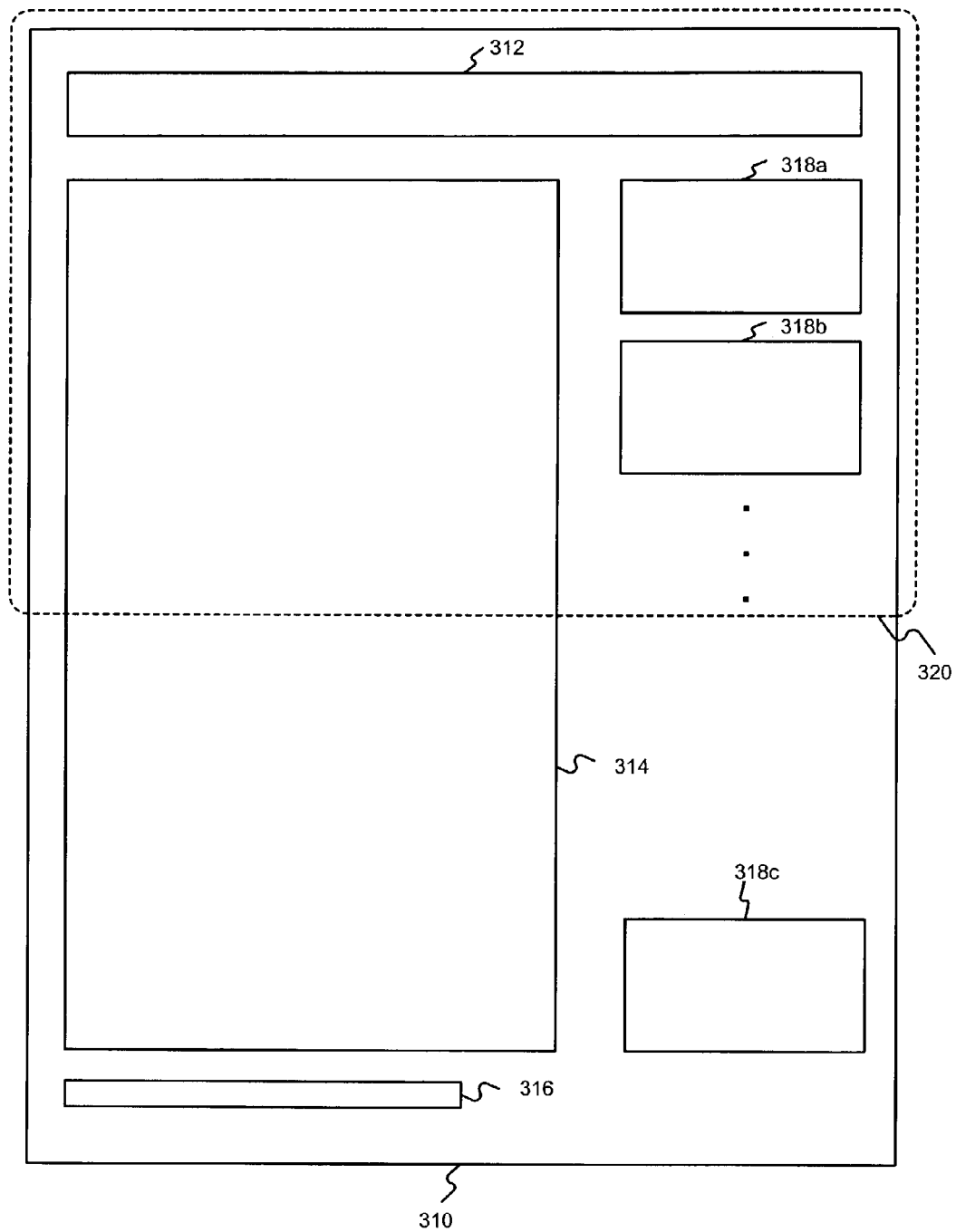
FIG. 3 is a block diagram of a Web page that may be generated by a page assembly operation of an ad consumer, for rendering on a viewer's screen.

The search engine may combine the search results with one or more of the advertisements provided by the system 120. This combined information including the search results and advertisement(s) is then forwarded towards the user that requested the content, for presentation to the user. For example, FIG. 3 is an abstract illustration of a display page 310 that may be provided by the search engine. The outline 320 depicted with dashed lines corresponds to a portion of the display page 310 that may be viewed on a typical personal computer display screen at a typical resolution. The exemplary display page 310 may include header information 312 (e.g., the name of search engine host), trailer information 316 (e.g., copyright, navigational hypertext links, etc.), a plurality of search results 314 and a plurality of ads 318a, 318b, and 318c. The search results 314 are maintained as distinct from the ads 318, so as not to confuse the user between paid advertisements and presumably neutral search results. Although FIG. 3 shows only three ads 318, embodiments consistent with the principles of the present invention may have more or less ads. For example, ten search results combined with ten ads has been found to be effective.

Finally, the search engine may transmit information about the ad and/or how the ad was rendered, or to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

Figure 2:
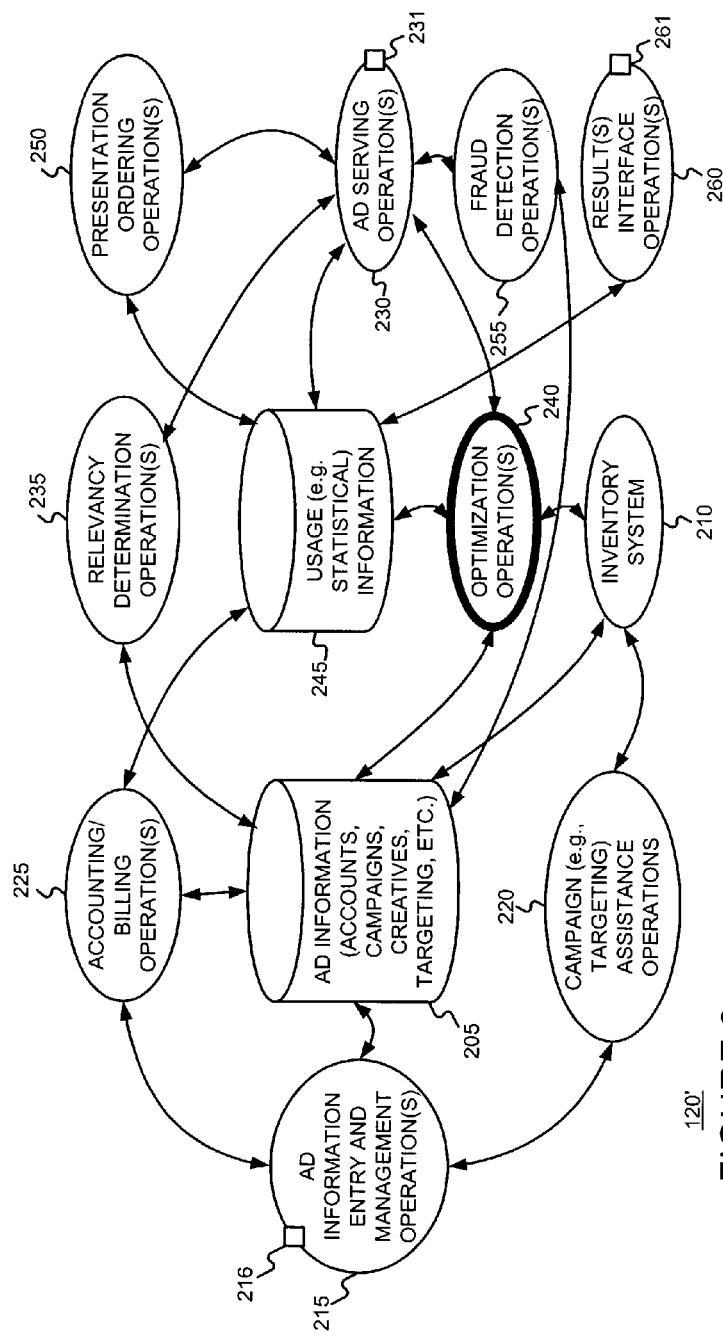
FIG. 2 is a bubble chart of an advertising environment in which, or with which, the present invention may operate.

FIG. 2 illustrates an exemplary ad system 120' with which, or in which, the present invention may be used. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(s) 220, accounting and billing operation(s) 225, ad serving operation(s) 230, relevancy determination operation(s) 235, optimization operations 240, presentation ordering operations 250, fraud detection operation(s) 255, and result(s) interface operation(s) 260. Advertisers 110 may interface with the system 120' via the ad information entry and management operation(s) 215 as indicated by interface 216. Ad consumers 130 may interface with the system 120' via the ad serving operation(s) 230 as indicated by interface 231. Ad consumers 130 or other entities (not shown) may also interface with the system 120' via results interface operation(s) 260 as indicated by interface 261.

Figure 4:
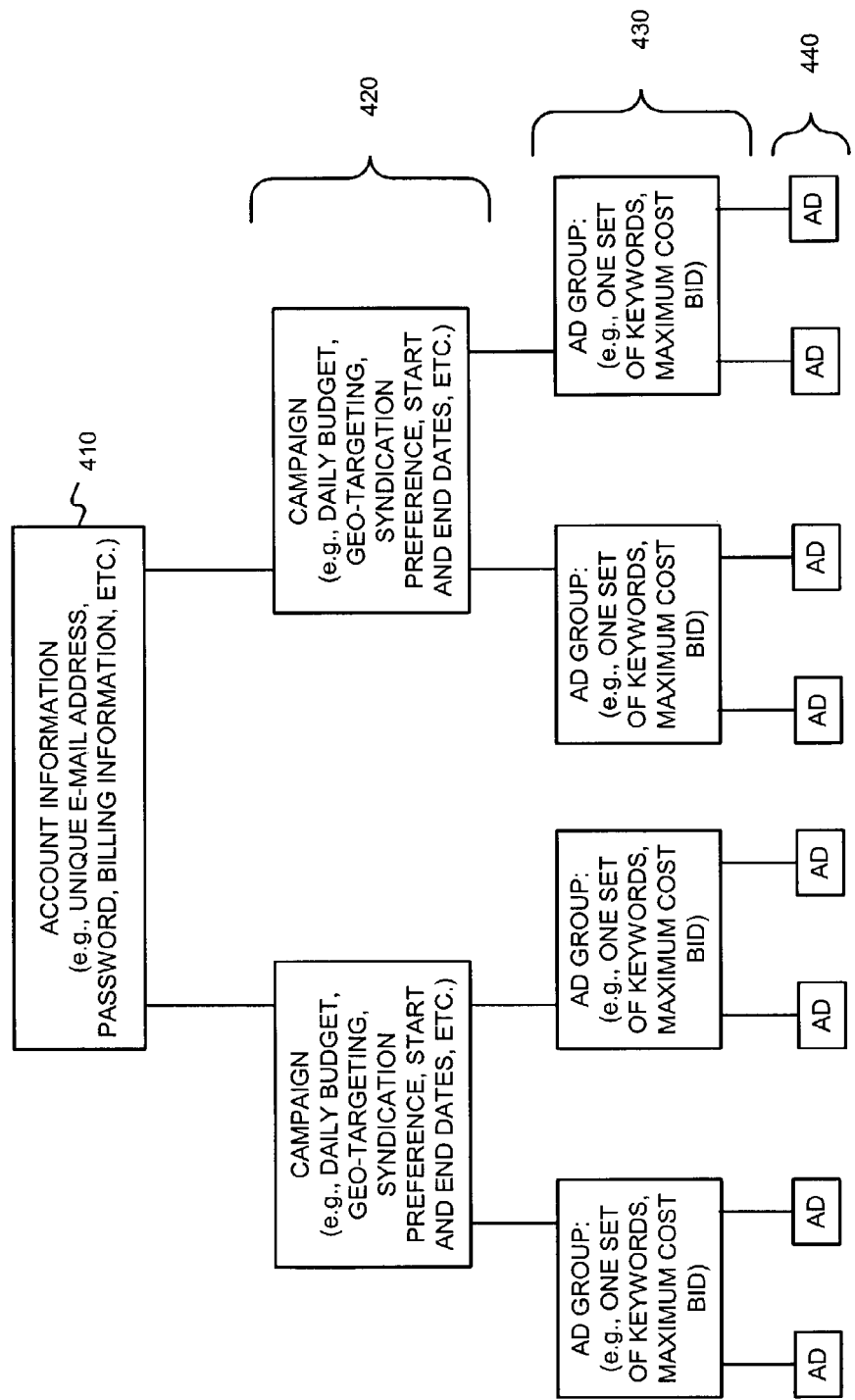
FIG. 4 is a block diagram illustrating an exemplary interrelationship of advertising information that may be used by the present invention.

In one embodiment of the exemplary ad system 120', an advertising program includes information concerning accounts, campaigns, creatives, targeting, etc. FIG. 4 illustrates an exemplary inter-relationship 400 of advertising information, some of which information may be used by the present invention. As shown, account information 410 may include, for example, a unique e-mail address, a password, billing information (e.g., a billing address, a credit card, etc.), etc. Accordingly, the term "account" relates to information for a given advertiser. Account information 410 may be associated with information 420 about one or more campaigns. Campaign information 420 may include, for example, one or more budgets for one or more time periods (e.g., a daily budget), geo-targeting information, syndication preference information, start and end dates of the campaign, etc. For example, Honda may have one advertising campaign for its automobile line, and a separate advertising campaign for its motorcycle line. Each campaign may be associated with information 430 about one or more ad groups. Ad group information 430 may include, for example, keywords (which may be used by the relevancy determination operation(s) to decide whether or not to serve an ad), and cost information, such as a maximum cost bid for example. Each ad group may be associated with information 440 about one or more ads. Ad information 440 may include, for example, content for the ad, a unique identifier, historical information about the ad or its performance, etc. Although a budget is shown as being provided as campaign information 420, one or more budget may be provided at any level of information.

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. That is, the relevancy determination operation(s) may be used to determine ads that may be served. The optimization operation(s) may then determine whether or not each of the candidate ads is, in fact, served. The ad serving operation(s) 230 may use presentation ordering operation(s) 250 to order the presentation of the ads to be returned. The fraud detection operation(s) 255 can be used to reduce fraudulent use of the advertising system (e.g., by advertisers), such as through the use of stolen credit cards. The result(s) interface operation(s) 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such result(s) information may be accepted at interface 261 and may include information to identify the ad and time the ad was served, as well as the associated result.

The principles of the present invention may be applied to the optimization operation(s) 240. For example, the present invention may operate on ads returned from relevancy determination operation(s) 235 or presentation ordering operation(s) 250. More specifically, the principles of the present invention may be applied to maximize ad revenue subject to budgetary constraints.

§4.2 Exemplary Embodiments

§4.2.1 Exemplary Method

Figure 5:
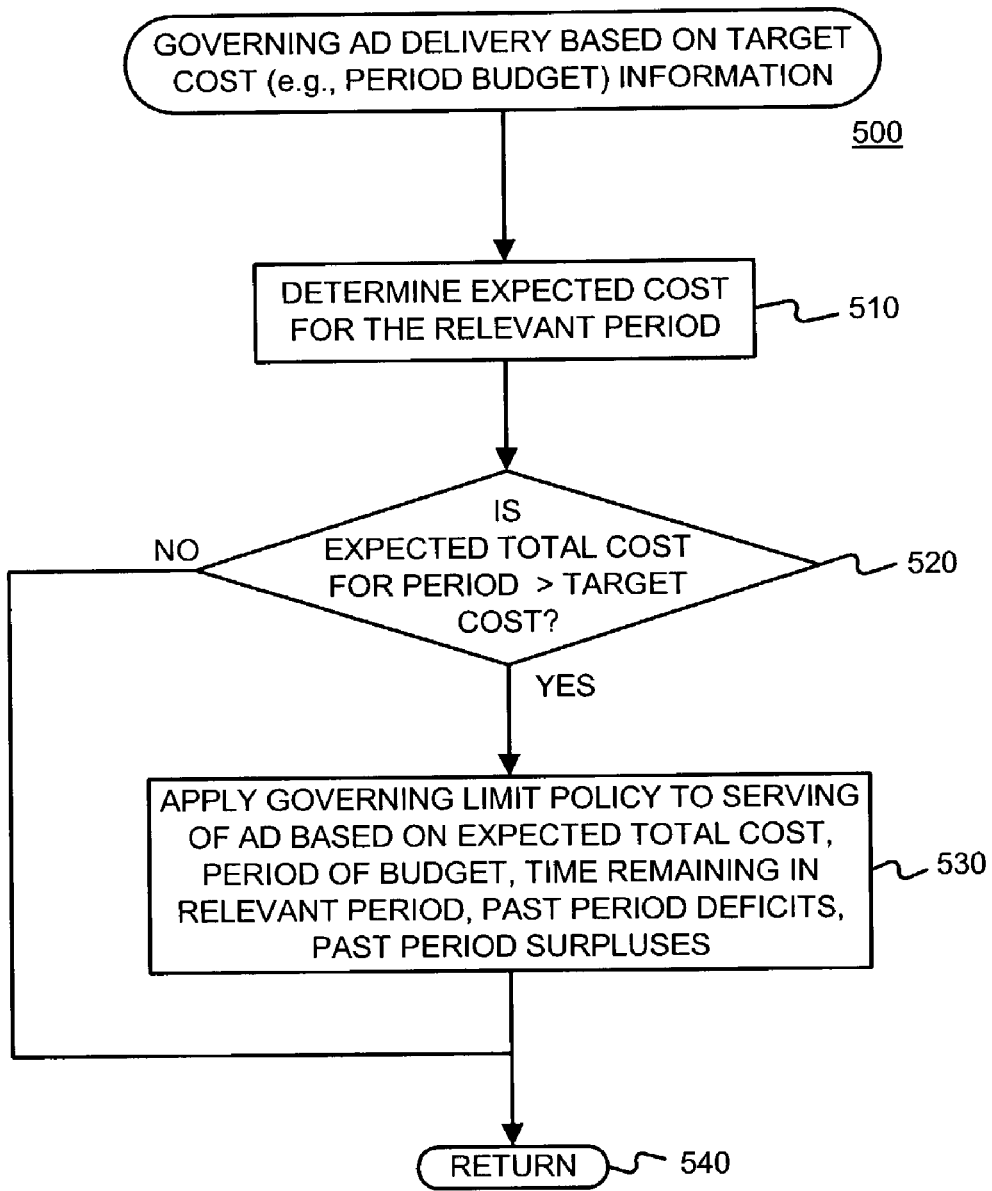
FIG. 5 is a flow diagram of an exemplary method that may be used to govern ad delivery based on target cost information, in an environment such as that of FIG. 2.

FIG. 5 is a flow diagram of an exemplary method 500 that may be used to govern ad delivery based on target cost information. The target cost may be for a given time period, such as a day. The method 500 may be performed to determine whether or not to serve an ad that would otherwise be served, such as a "relevant" ad that "places" high enough. An expected total cost for the relevant period is determined (block 510). (An exemplary method for determining such an expected cost is described later, with reference to FIG. 6.) At decision block 520, it is determined whether the expected total cost for the relevant period is greater than a target cost for the relevant period. If so, a governing policy may be applied to the serving of the ad (block 530) before the method 500 is left via RETURN node 540. The policy may be based on the expected total cost, the period of the budget, time remaining in the relevant period, deficits or surpluses from past periods, time remaining in the campaign, etc.

The term "target cost" should be broadly construed to include any predetermined cost or determinable cost. One example of a target cost is a daily budget. Alternatively, the target cost may be a function of the daily budget, say 120% of the daily budget for example. The target cost may be the same over all periods of the campaign, or may vary from period to period. For example, the target cost can be made greater than a daily budget for days at the start of the campaign, and vary as a function of past period deficits or surpluses for days at the end of the campaign.

The term "govern" should be broadly construed to include any policy that can be applied to determine whether or not to serve an ad. One example of governing the delivery of ads is to serve ads until some cost budget is reached, and then serve no ads. Another example of governing the delivery of ads is to deliver the ads less often when the expected total cost is greater than the target cost. In this example, suppose that the target cost is a daily budget of $1000.00 and expected total cost is $3,000.00. The delivery of an ad may be governed such that the ad is delivered every third time that it would otherwise be delivered.

Although the method 500 was described in the context of a particular target cost period, the principles of the present invention may be applied to multiple target costs over multiple periods. For example, the delivery of an ad may be governed based on both a daily budget, a monthly budget, a quarterly budget, and a campaign budget. In such an instance, the delivery of the ad could be subject to multiple constraints.

Figure 6:
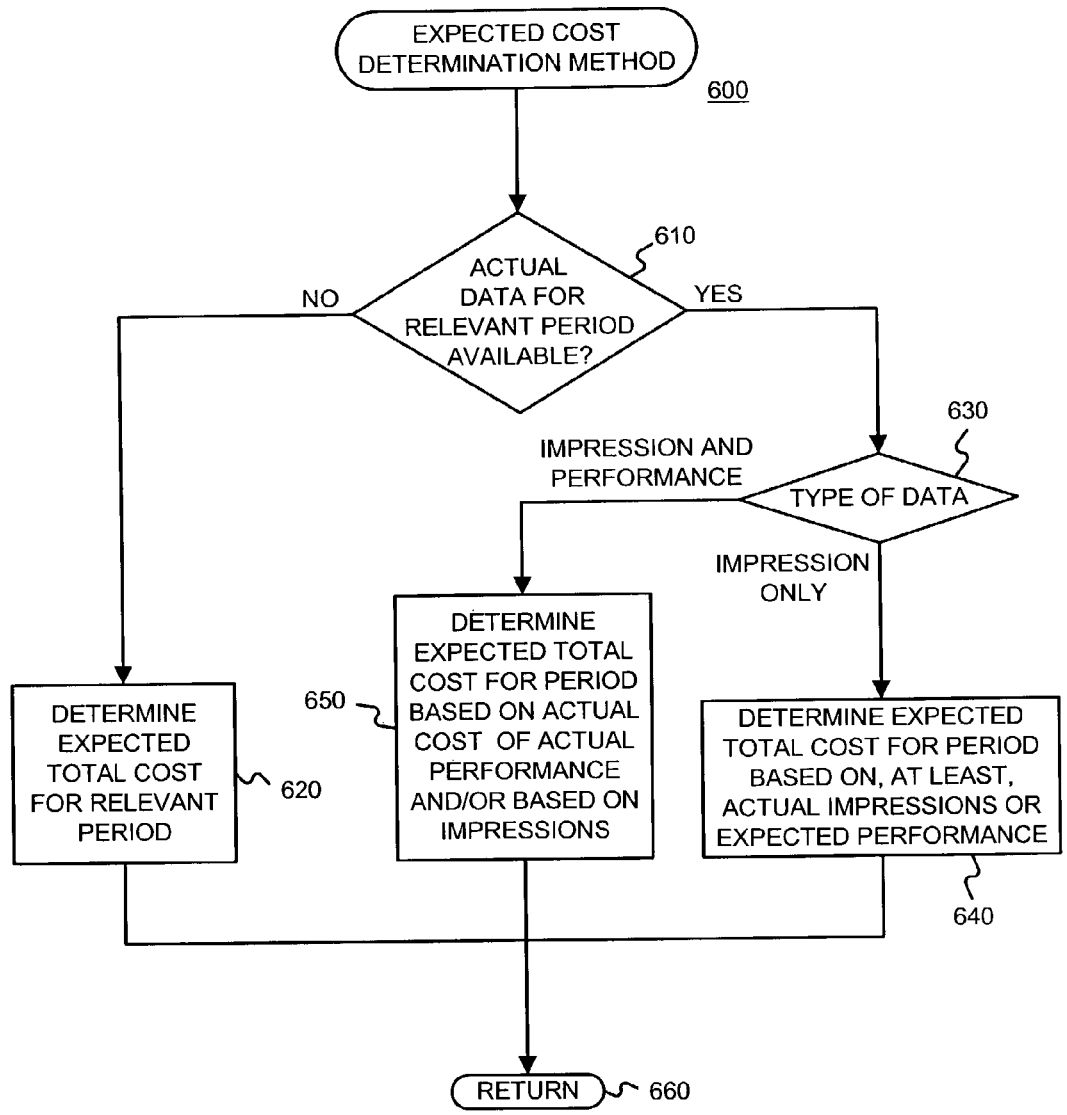
FIG. 6 is a flow diagram of an exemplary method that may be used to determine an expected cost for a given time period.

Recall from block 510 that an expected total cost for a relevant period is determined. FIG. 6 is a flow diagram of an exemplary method 600 that may be used to determine expected total cost for the relevant period. This expected total cost is the cost expected to accrue were it not for governing the delivery of the ad. As indicated by decision block 610, it may be determined whether or actual data for the relevant period is available. For example, if the relevant period is a day, it can be determined whether or not the ad was already served, whether or not the ad was clicked, whether or not a conversion occurred, etc. If no such actual data is used, the expected total cost for the relevant period (without regard to a target (e.g., budgeted) cost is determined (block 620).

The expected total cost may be predicted in any one of a number of ways, some of which will be apparent to those skilled in the art. For example, the expected total cost for a relevant period may be based historic cost information for the particular ad of interest. Alternatively, or in addition, if the ad of interest has no historical information or limited historical information, its keyword(s) can be used to determine estimated impressions per day. If clicks per impression of similar ads (ads with the same or similar keywords) is available, or if some overall clicks per impression for all ads is available, then the ads cost per performance (e.g., cost per click) can be used to estimate a daily cost. The method 600 is then left via RETURN node 660.

Referring back to decision block 610, if actual data for the relevant period is available, the method 600 proceeds to decision block 630 where it is determined what type of data is available. (Note that this exemplary method 600 assumes that the cost for ad serving is based, at least in part, on ad performance, not just impressions.) If only impression data is available, then the expected total cost for the relevant period, based, at least in part, on actual impressions and expected performance, is determined (block 640) before the method 600 is left via RETURN node 660. For example, assuming that past performance information (e.g., clicks per 100 impressions—also referred to as the click through rate) is available for the ad, an expected cost may be determined, for example, by extrapolating the number of impressions thus far for the number of impressions for the relevant period of time, multiplying the expected number of impressions by the clicks/impressions, and multiplying that product by a cost/click value.

Referring back to decision block 630, if both impression and performance data is available, then the expected cost for the relevant period, based, at least in part, on the actual performance (and possibly impressions) may be determined (block 650) before the method 600 is left via RETURN node 660.

§4.2.2 Exemplary Apparatus and Data Structures

Figure 7:
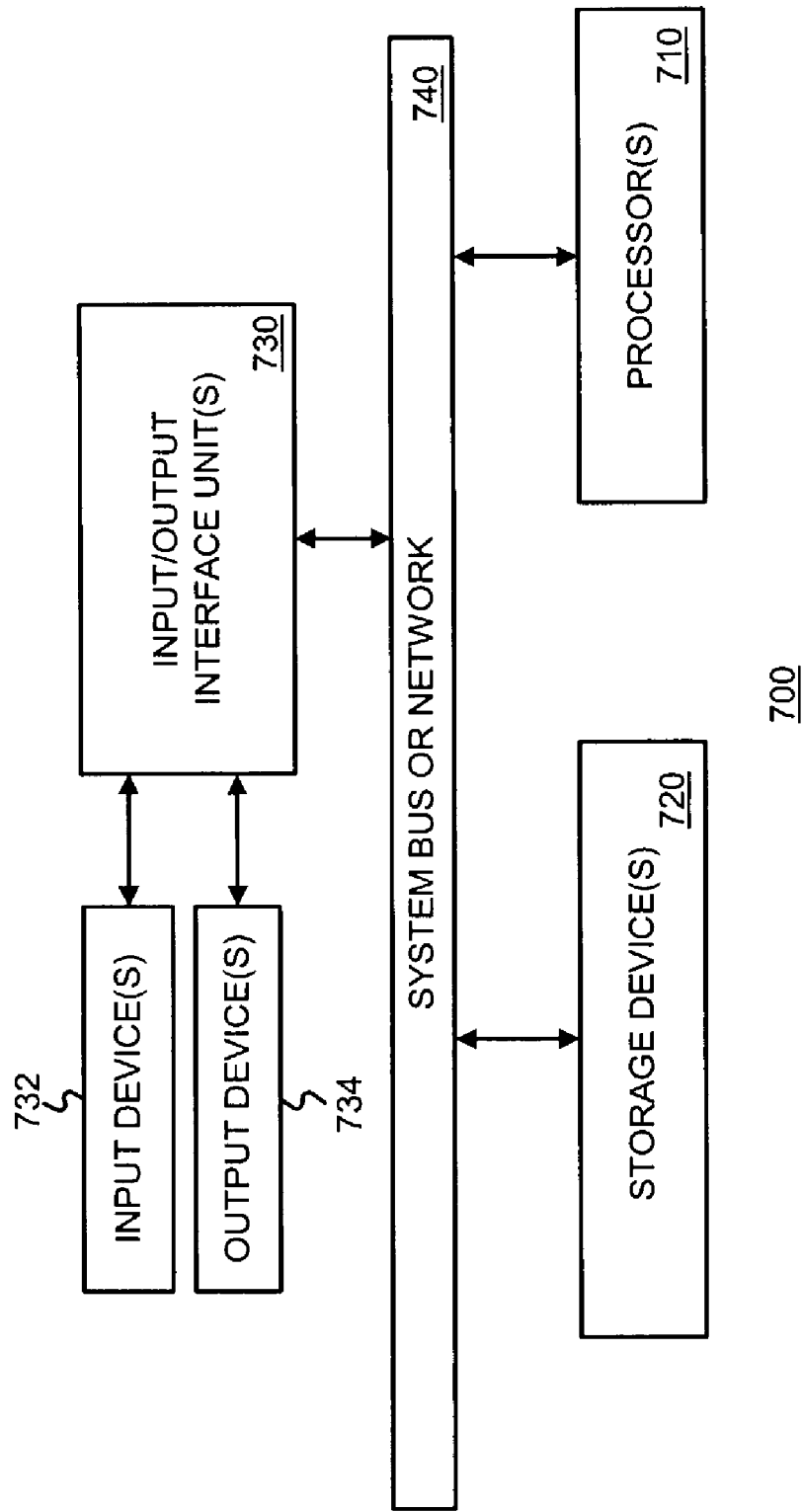
FIG. 7 is a high-level block diagram of apparatus that may be used to perform at least some of the various operations that may be performed consistent with the principles of the present invention.

FIG. 7 is high-level block diagram of a machine 700 that may perform one or more of the operations discussed above. The machine 700 basically includes a processor(s) 710, an input/output interface unit(s) 730, a storage device(s) 720, and a system bus or network 740 for facilitating the communication of information among the coupled elements. An input device(s) 732 and an output device(s) 734 may be coupled with the input/output interface(s) 730.

The processor(s) 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 720 and/or may be received from an external source via an input interface unit 730.

In one embodiment, the machine 700 may be one or more conventional personal computers. In this case, the processing unit(s) 710 may be one or more microprocessors. The bus 740 may include a system bus. The storage devices 720 may include system memory, such as read only memory (ROM) and/or random access memory (RAM). The storage device(s) 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. However, in the context of governing the delivery of ads, no input devices, other than those needed to accept data, and possibly those for system administration and maintenance, are needed.

The output device(s) 734 may include a monitor or other type of display device, which may also be connected to the system bus 740 via an appropriate interface. In addition to (or instead of) the monitor, the personal computer may include other (peripheral) output devices (not shown), such as speakers and printers for example. Again, in the context of ad term(s) of governing the delivery of ads, no output devices, other than those needed to output billing information, and possibly those for system administration and maintenance, are needed.

§4.3 Example Illustrating Operation of an Exemplary Embodiment

Figure 8:
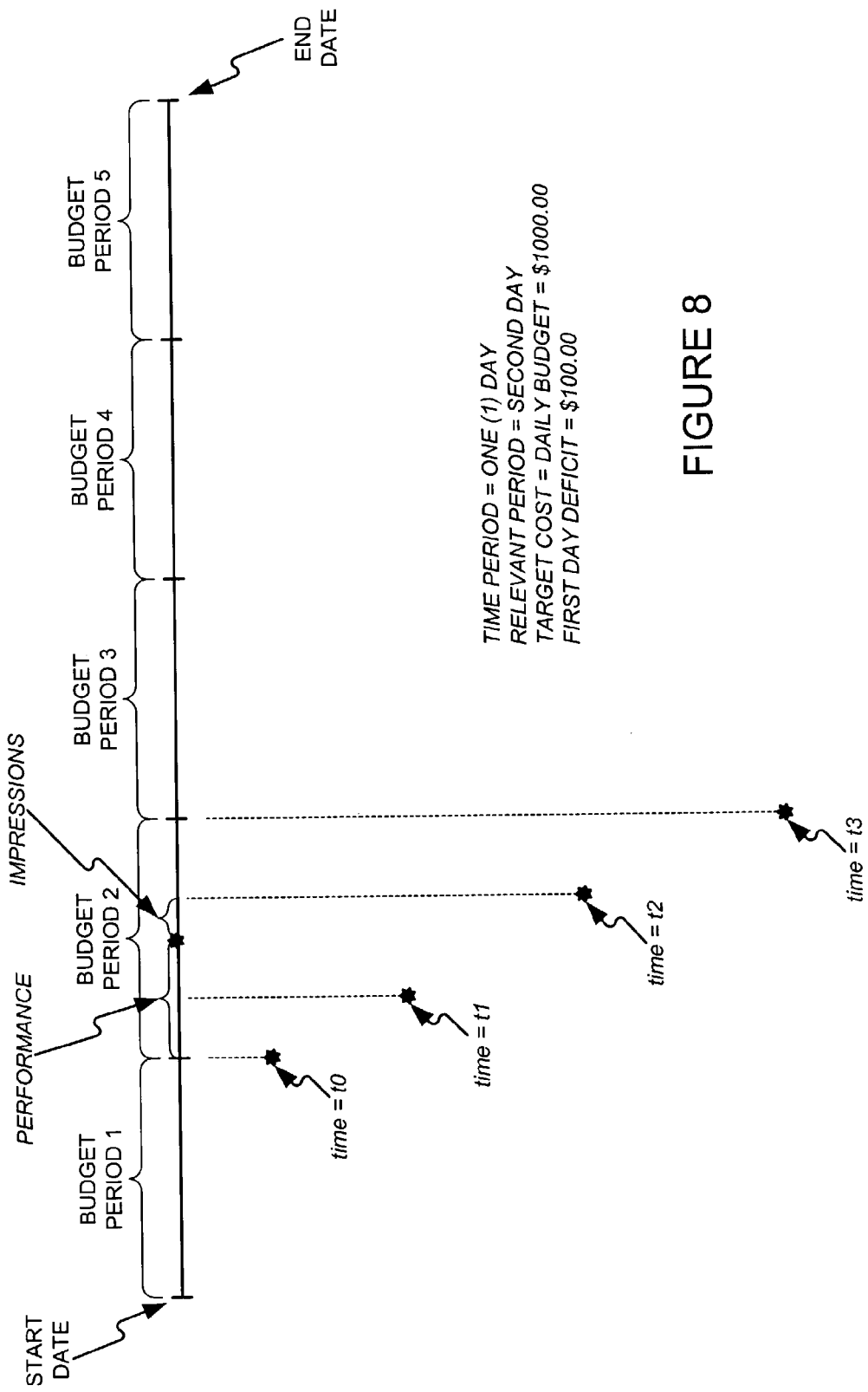
FIG. 8 is a diagram that illustrates one application of the principles of the present invention.

FIG. 8 is an example which illustrates the operation of an exemplary embodiment of the present invention as applied to the governing of ad delivery in a second day of a five (5) day campaign which is subject to a daily budget of $1000.00. In this example, the target cost is set to the daily budget.

Suppose that the advertiser pays $1.20 for each click-through on the ad and that the ad has a click-through rate of 10%. Finally, suppose that the first day of the campaign went $100.00 over budget. Note that it may be permitted (and desired) to have the day two (2) cost exceed the daily budget, so long as the sum of all daily costs does not exceed five (5) times the daily budget. More generally:

$$\sum_{i=1}^{n} cost_i \leq n \cdot (\text{period budget})$$

where $n \equiv$ the number of periods in the campaign

If the above relationship is violated, it may be desired to have the ad delivery entity absorb the extra costs. However, it is desirable to ensure that the relationship is not violated.

Referring now to FIG. 8, suppose at time t0 that the ad may (e.g., based on its relevancy to a query) be served. At this time, there will be no actual data for the second day. (Recall, e.g., the left branch from decision block 610.) The expected total cost may simply be estimated based on various factors. For example, keywords associated with the ad may be used to estimate how may times the ad would be served (if its delivery were not governed) in the period as well as the cost. Suppose that the expected total cost for the second day is $2500.00. Since this is greater than the daily budget of $1000.00, a governing policy is applied. Suppose the governing policy is expressed as the following rule-based functions:

If period is in the first half of the campaign, then deliver ad every x times, where $$x = \frac{\text{expected cost}}{(\text{target cost} - \text{deficits} + \text{surpluses}) \cdot \left(0.5 \cdot \frac{\text{time remaining in period}}{\text{total time of period}} + 1\right)};$$

If period is in the last half of the campaign, but not in the final period, then
deliver ad every x times, where $$x = \frac{\text{expected cost}}{(\text{target cost} - \text{deficits} + \text{surpluses}) \cdot \left(0.2 \cdot \frac{\text{time remaining in period}}{\text{total time of period}} + 1\right)}; \text{ and}$$

If the period is the last period of the campaign, then deliver ad every x times, where $$x = \frac{\text{expected cost}}{(\text{target cost} - \text{deficits} + \text{surpluses})}$$

Under such a policy, at time t0, the ad would be delivered once every $$1.85 \left( = \frac{2500}{(1000 - 100 + 0) \cdot \left( 0.5 \left( \frac{1P}{1P} \right) + 1 \right)} \right)$$

times that it would have been if no budget were applied.

At time t1, suppose that the ad to be served has already been served a number of times, but that there is no information on the actual performance of the ad (e.g., whether or not the ad was clicked). (Recall, e.g., lower branch from decision block 630.) Here assume that 2000 impressions have been served and that t1 is one sixth (⅙) of the way through the second day. The expected total cost may be 2000 impressions×6×0.10 clicks/impression×$1.20/click=$1440.00. Since this expected cost is greater than the daily budget of $1000.00, the delivery governing policy is applied. Under the exemplary policy, at time t1, the ad would be delivered once every $$1.129 \left( = \frac{1400}{(1000 - 100 + 0) \cdot \left( 0.5 \left( \frac{5/6P}{5/6P} \right) + 1 \right)} \right)$$

times that it would have been if no budget were applied.

At time t2, suppose that actual performance information becomes available. (Recall, e.g., the left branch from decision block 630.) For example, in the context of a distributed ad serving system, real-time feedback of performance might not be possible. Suppose that actual performance information is returned halfway through the period and that there were 650 clicks at that time. Suppose further that there were 3220 impressions since then and t2 is three quarters (¾) of the way through the second day. The expected total cost may be (650 clicks×$1.20/click)+(3220 impressions×2×0.10 clicks/impression×$1.20/click), where the first part corresponds to actual costs accrued based on actual clicks and the second part is expected costs for the rest of the second day. Here, the expected total cost would be $780.00+$772.00=$1552.00. Since this expected cost is greater than the daily budget of $1,000.00, the delivery governing policy is applied. Under the exemplary policy, at time t2, the ad would be delivered once every $$1.532 \left( = \frac{1552}{(1000 - 100 + 0) \cdot \left( 0.5 \left( \frac{1/4P}{1/4P} \right) + 1 \right)} \right)$$

times that it would have been if no budget were applied.

At time t3, or some time after when the actual performance information for the second day is returned, a budget surplus or deficit can be determined and saved. For example, if the ad was clicked 970 times, the actual cost for the second day would be $1164.00 and a budget deficit of $164.00 would be determined and possibly stored for future use.

Naturally, the present invention is not limited to any particular aspects of the foregoing example.

§4.4 Conclusions

As can be appreciated from the foregoing disclosure, the present invention helps advertisers to control marketing expenditures. The present invention permits ads to be served fairly regularly without undershooting budgets, though it is not so limited.

What is claimed is:

1. A computer implemented method for governing delivery of an advertisement over a specified time period, the method comprising:
   a) determining, using a computer system including one or more computers, an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(an expected rate of selections per impression)*(a cost per selection value); and
   b) governing, using the computer system, the delivery of the advertisement over the specified time period based on the expected total cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

2. The computer-implemented method of claim 1 wherein the act of governing the delivery of the advertisement is further based on at least one of (A) time remaining in the specified time period, (B) budget deficits from past periods, (C) budget surpluses from past periods, (D) time since a start date associated with the advertisement, and (E) time until an end date associated with the advertisement.

3. The computer-implemented method of claim 1 wherein the act of governing the delivery of the advertisement includes
   i) determining, using the computer system, whether or not the expected cost for the specified time period exceeds the target cost for the specified time period, and
   ii) if it is determined that the expected cost for the time period exceeds the target cost, then governing, using the computer system, the delivery of the advertisement based on the expected cost and the target cost, otherwise serving the ad during the specified time period without governing.

4. The computer-implemented method of claim 1 wherein the advertisement has associated keywords, wherein the delivery of the advertisement is based on the associated keywords, and wherein the number of expected impressions in the specified time period is based on the associated keywords.

5. The computer-implemented method of claim 1 wherein the advertisement has associated keywords, wherein the delivery of the advertisement is based on the associated keywords, and wherein the expected rate of selections per impression in the specified time period is based on the associated keywords.

6. The computer-implemented method of claim 1 wherein the advertisement has an associated start date and an associated end date, wherein there are a plurality of time periods within the associated start date and the associated end date, and wherein the act of governing the delivery of the advertisement is based on a policy under which delivery is made dependent on the specified time period relative to at least one of the associated start date and the associated end date.

7. The computer-implemented method of claim 1 wherein the act of governing the delivery of the advertisement is based on a policy under which delivery is made dependent on a time expired since the start of the specified time period.

8. The computer-implemented method of claim 7 wherein the policy is defined towards making delivery non-linear with respect to time, such that a rate of delivery of impressions of the advertisement is not constant.

9. The computer-implemented method of claim 7 wherein the policy is biased towards providing more delivery of the advertisement early in the specified time period than later in the specified time period.

10. The computer-implemented method of claim 1 wherein the specified time period is one of a day, a week, a month, three months, and a year.

11. The computer-implemented method of claim 1 wherein the act of governing the delivery of the advertisement is further based on an additional target cost.

12. The computer-implemented method of claim 11 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

13. The computer-implemented method of claim 1 wherein an actual cost of delivering multiple impressions of the advertisement, not subject to budget constraints, over the specified time period is unknown at the start of the time period.

14. Apparatus for governing delivery of an advertisement over a specified time period, the apparatus comprising:
   a) one or more processors;
   b) at least one input device; and
   c) one or more storage devices storing processor-executable instructions which, when executed by one or more processors, perform a method of:
      i) determining an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(an expected rate of selections per impression)*(a cost per selection value); and
      ii) governing the delivery of the advertisement over the specified time period based on the expected cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

15. The apparatus of claim 14 wherein the act of governing the delivery of the advertisement further governs delivery based on at least one of (A) time remaining in the specified time period, (B) budget deficits from past periods, (C) budget surpluses from past periods, (D) time since a start date associated with the advertisement, and (E) time until an end date associated with the advertisement.

16. The apparatus of claim 14 wherein the act of governing the delivery of the advertisement includes
   1) determining whether or not the expected cost for the specified time period exceeds the target cost, and
   2) governing the delivery of the advertisement based on the expected cost and the target cost if it is determined that the expected cost for the specified time period exceeds the target cost, otherwise serving the ad during the specified time period without governing.

17. The apparatus of claim 14 wherein the advertisement has associated keywords, wherein the delivery of the advertisement is based on the associated keywords, and wherein the number of expected impressions in the specified time period is based on the associated keywords.

18. The apparatus of claim 14 wherein the advertisement has associated keywords, wherein the delivery of the advertisement is based on the associated keywords, and wherein the expected rate of selections per impression in the specified time period is based on the associated keywords.

19. The apparatus of claim 14 wherein the advertisement has an associated start date and an associated end date, wherein there are a plurality of time periods within the associated start date and the associated end date, and wherein the act of governing the delivery of the advertisement is based on a policy under which delivery is made dependent on the specified time period relative to at least one of the associated start date and the associated end date.

20. The apparatus of claim 14 wherein the act of governing the delivery of the advertisement does so based on a policy under which delivery is made dependent on a time expired since the start of the specified time period.

21. The apparatus of claim 20 wherein the policy is defined towards making delivery non-linear with respect to time, such that a rate of delivery of impressions of the advertisement is not constant.

22. The apparatus of claim 20 wherein the policy is biased towards providing more delivery of the advertisement early in the specified time period than later in the specified time period.

23. The apparatus of claim 14 wherein the specified time period is one of a day, a week, a month, three months, and a year.

24. The apparatus of claim 14 wherein governing the delivery of the advertisement does so further based on an additional target cost.

25. The apparatus of claim 24 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

26. The apparatus of claim 14 wherein an actual cost of delivering multiple impressions of the advertisement, not subject to budget constraints, over the specified time period is unknown at the start of the time period.

27. A computer implemented method for governing delivery of an advertisement over a specified time period, the method comprising:
  a) determining, using a computer system including one or more computers, an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(a cost per impression value); and
  b) governing, using the computer system, the delivery of the advertisement over the specified time period based on the expected total cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

28. The computer-implemented method of claim 27 wherein the act of governing the delivery of the advertisement is further based on an additional target cost.

29. The computer-implemented method of claim 28 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

30. A computer implemented method for governing delivery of an advertisement over a specified time period, the method comprising:
  a) determining, using a computer system including one or more computers, an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(an expected rate of conversions per impression)*(a cost per conversion value); and
  b) governing, using the computer system, the delivery of the advertisement over the specified time period based on the expected total cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

31. The computer-implemented method of claim 30 wherein the act of governing the delivery of the advertisement is further based on an additional target cost.

32. The computer-implemented method of claim 31 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

33. Apparatus for governing delivery of an advertisement over a specified time period, the apparatus comprising:
   a) one or more processors;
   b) at least one input device; and
   c) one or more storage devices storing processor-executable instructions which, when executed by one or more processors, perform a method of:
      i) determining an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(a cost per impression value); and
      ii) governing the delivery of the advertisement over the specified time period based on the expected cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

34. The apparatus of claim 33 wherein governing the delivery of the advertisement does so further based on an additional target cost.

35. The apparatus of claim 34 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

36. Apparatus for governing delivery of an advertisement over a specified time period, the apparatus comprising:
   a) one or more processors;
   b) at least one input device; and
   c) one or more storage devices storing processor-executable instructions which, when executed by one or more processors, perform a method of:
      i) determining an expected total cost associated with delivering multiple impressions of the advertisement, not subject to budget constraints, over the specified time period, wherein a budget constraint is a maximum cost per unit of time, and wherein the expected total cost is determined as (an expected number of impressions of the advertisement over the specified time period)*(an expected rate of conversions per impression)*(a cost per conversion value); and
      ii) governing the delivery of the advertisement over the specified time period based on the expected cost and a target cost for the specified time period, wherein the target cost is one of a (A) daily, (B) weekly, (C) monthly, (D) quarterly and (E) yearly budget associated with one of (A) the advertisement, (B) an ad group to which the advertisement belongs, (C) a campaign to which the advertisement belongs, and (D) an account to which the advertisement belongs.

37. The apparatus of claim 36 wherein governing the delivery of the advertisement does so further based on an additional target cost.

38. The apparatus of claim 37 wherein the additional target cost includes one of (A) a daily budget associated with the advertisement, (B) a daily budget associated with an ad group to which the advertisement belongs, (C) a daily budget associated with a campaign to which the advertisement belongs, (D) a daily budget associated with an account to which the advertisement belongs, (E) a weekly budget associated with the advertisement, (F) a weekly budget associated with an ad group to which the advertisement belongs, (G) a weekly budget associated with a campaign to which the advertisement belongs, (H) a weekly budget associated with an account to which the advertisement belongs, (I) a monthly budget associated with the advertisement, (J) a monthly budget associated with an ad group to which the advertisement belongs, (K) a monthly budget associated with a campaign to which the advertisement belongs, (L) a monthly budget associated with an account to which the advertisement belongs, (M) a quarterly budget associated with the advertisement, (N) a quarterly budget associated with an ad group to which the advertisement belongs, (O) a quarterly budget associated with a campaign to which the advertisement belongs, (P) a quarterly budget associated with an account to which the advertisement belongs, (Q) a yearly budget associated with the advertisement, (R) a yearly budget associated with an ad group to which the advertisement belongs, (S) a yearly budget associated with a campaign to which the advertisement belongs, and (T) a yearly budget associated with an account to which the advertisement belongs.

* * * * *